US010277405B2

(12) United States Patent
Lu et al.

(10) Patent No.: US 10,277,405 B2
(45) Date of Patent: Apr. 30, 2019

(54) METHOD FOR UPDATING SEED DATA IN DYNAMIC TOKEN

(71) Applicants: Feitian Technologies Co., Ltd., Beijing (CN); Hypersecu Information Systems, Inc., Richmond (CA)

(72) Inventors: Zhou Lu, Beijing (CN); Huazhang Yu, Beijing (CN); Mingji Li, Richmond (CA)

(73) Assignees: Feitian Technologies Co., Ltd., Beijing (CN); Hypersecu Information Systems, Inc., Richmond, BC (CA)

( * ) Notice: Subject to any disclaimer, the term of this patent is extended or adjusted under 35 U.S.C. 154(b) by 42 days.

(21) Appl. No.: 15/509,548

(22) PCT Filed: Feb. 17, 2015

(86) PCT No.: PCT/CN2015/073220
§ 371 (c)(1),
(2) Date: Mar. 8, 2017

(87) PCT Pub. No.: WO2016/095339
PCT Pub. Date: Jun. 23, 2016

(65) Prior Publication Data
US 2017/0310487 A1    Oct. 26, 2017

(30) Foreign Application Priority Data
Dec. 15, 2014  (CN) .......................... 2014 1 0777740

(51) Int. Cl.
*H04L 9/32* (2006.01)
*H04L 9/06* (2006.01)
*H04L 9/08* (2006.01)

(52) U.S. Cl.
CPC .......... *H04L 9/3263* (2013.01); *H04L 9/0618* (2013.01); *H04L 9/0891* (2013.01); *H04L 9/3228* (2013.01)

(58) Field of Classification Search
CPC ... H04L 9/3263; H04L 9/3228; H04L 9/0618; H04L 9/0891
See application file for complete search history.

(56) References Cited

U.S. PATENT DOCUMENTS 8,230,496 B2    7/2012 Lu et al.
9,306,741 B1 *  4/2016 Brainard ................. H04L 63/08
(Continued)

OTHER PUBLICATIONS

Jayarana et al, Dynamic Mobile Token for Web Security using MD5 and One Time Password Method, 6 pages (Year: 2012).*

*Primary Examiner* — Ali S Abyaneh
*Assistant Examiner* — Huan V Doan
(74) *Attorney, Agent, or Firm* — Hammer & Associates, P.C.

(57) ABSTRACT

A method for updating seed data in a dynamic token comprises: an interaction interface sends user information to an application server for verification, receives a verification result returned by the application server, continuously receives dynamic token information when the verification result is valid, and sends same to the application server; the application server generates a request data packet containing the dynamic token information and application information and sends same to an authentication center; the authentication center acquires seed data corresponding to the dynamic token information and the application information and sends same to the application server; the application server converts the seed data into photosensitive data and displays same by means of the interaction interface; and the dynamic token obtains the seed data by acquiring the photosensitive data. The present invention can realize that the seed data in (Continued)

a dynamic token is automatically updated by a user, and meanwhile, a dynamic token can be applied to multiple applications.

17 Claims, 4 Drawing Sheets

(56) References Cited

U.S. PATENT DOCUMENTS

| | | | |
|---|---|---|---|
| 9,654,467 B1* | 5/2017 | Juels | H04L 63/0846 |
| 2010/0064344 A1* | 3/2010 | Wang | H04W 12/04 |
| | | | 726/3 |
| 2016/0057134 A1* | 2/2016 | Falk | G06F 21/335 |
| | | | 726/6 |

* cited by examiner

METHOD FOR UPDATING SEED DATA IN DYNAMIC TOKEN

FIELD OF THE INVENTION

The present invention relates to a method for updating seed data in a dynamic token, which belongs to information security field.

PRIOR ART

In prior art, OTP (One-time password) is a safe and convenient technology which prevents an account number from being pilfered. A random combination of numbers, which is unpredictable, is generated as a one-time password according to a special algorithm, and each OTP can only be used once. When the user is authenticated by a system, he or she must enters an OTP associated with an account number and a static password, and the user can get access to the system and conduct a transaction when the account number, the static password and the OTP are authenticated successfully. In this way, legitimate and uniqueness of the user can be ensured. The most important advantage of the dynamic token is that each OTP used by a user is different from time to time. Therefore, the user's identity cannot be copied by hackers. It is acknowledged that the technology of authentication via an OTP is one of the most effective way for authenticating user's identity. The technology can protect users from exposing to online scams such as account password being stolen by hackers or Trojan, fake website, which leads to monetary and proprietary damages. At present, the OTP technology is applied in multiple fields such as E-bank, online game, telecommunication operator, E-governance and enterprise.

At present, seed data are usually built in dynamic tokens by token producers before the dynamic tokens leave factory. After being activated, the token cannot be updated by a user, and the token can only be used in single application.

SUMMARY OF THE INVENTION

The object of the invention is to provide a method for updating seed data in a dynamic token, which can realize that the seed data can be updated by a user, and meanwhile the dynamic token can be applied in multiple application.

Therefore, the present invention provides a method for updating seed data in a dynamic token, including:

Step S1), sending, by an interactive interface, user's information to an application server for authentication after the user's information is received by the interactive interface, and waiting for receiving an authentication result;

Step S2), authenticating, by the application server, whether the user's information is legitimate after the user's information is received by the application server, and returning the authentication result to the interactive interface;

Step S3), outputting, by the interactive interface, information indicating that the user's information is illegitimate in the case that the authentication result received by the interactive interface is that the user's information is illegitimate, and ending; waiting for receiving dynamic token information in the case that the authentication result received by the interactive interface is that the user's information is legitimate; sending the dynamic token information to the application server when the dynamic token information is received, and then waiting for receiving light sensation data;

Step S4), generating, by the application server, a first request packet which includes application information and the dynamic token information after the dynamic token information is received by the application server, sending the first request packet to certificate authority, and waiting for receiving seed data;

Step S5), determining, by the certificate authority, whether the dynamic token information in the first request packet is legitimate after the first request packet is received by the certificate authority. if yes, obtaining the seed data corresponding to the application information and the dynamic token information in the first request packet, returning the seed data to the application server, and executing Step S6; otherwise, returning information indicating that the dynamic token information is illegitimate to the application server, and executing Step S9;

Step S6), transferring, by the application server, the seed data and the application information to light sensation data after the seed data is received by the application server, and returning the light sensation data to the interactive interface;

Step S7), outputting, by the interactive interface, the light sensation data after the light sensation data is received by the interactive interface;

Step S8), collecting, by the dynamic token, the light sensation data outputted by the interactive interface to obtain the seed data and the application information, storing the seed data along with the application information correspondingly, and ending;

Step S9), sending, by the application server, information indicating that the dynamic token information is illegitimate to the interactive interface after the application server receives information indicating that the dynamic token information is illegitimate; and Step S10), outputting, by the interactive information, information indicating that the dynamic token information is illegitimate after the interactive interface receives information indicating that the dynamic token information is illegitimate, and ending.

Preferably, the dynamic token information specifically including: a serial number on a shell of the dynamic token, or a serial number stored inside the token, or the serial number on the shell of the token and the serial number stored inside the token, or the serial number on the shell of the token and an one time password generated by the token according to initial seed data.

Preferably, in the case that the dynamic token information is the serial number stored inside the token, or the serial number on the shell of the token and the serial number stored inside the token, before the dynamic token information is received. Step S3 further including: displaying the serial number stored inside the token after a user's request is received by the dynamic token.

Preferably, in the case that the dynamic token information is the serial number on the shell of the dynamic token and the OTP generated by the dynamic token according to the initial seed data, before the dynamic token information is received. Step S3 further including: generating an OTP according to the initial seed data stored in the dynamic token, and displaying a generated OTP after the user's request is received by the dynamic token.

Preferably, in the case that the dynamic token information is the serial number on the shell of the dynamic token and the serial number stored inside the dynamic token. in Step S4, after the dynamic token information is received by the application server, and before the first request packet including the application information and the dynamic token information is generated, the step further including: determining, by the application server whether the serial number on the shell of the dynamic token is as same as a serial number which is bound with the user's information; if yes, generating the first request packet which includes the application information and the dynamic token information; otherwise, returning information indicating that the dynamic token information does not correspond to the user's information to the interactive interface; the method further including: outputting the information indicating that the dynamic token information dose not correspond to the user's information when the information is received by the interactive interface, and ending.

Preferably, in the case that the dynamic token information is the serial number on the shell of the dynamic token, or the serial number stored inside the dynamic token, or the serial number on the shell of the dynamic token and the OTP generated by the dynamic token according to the initial seed data, determining, by the certificate authority, whether the dynamic token information in the first request packet is legitimate specifically including: the certificate authority determining whether a serial number as same as the serial number in the first request packet exists; if yes, the dynamic token information in the first request packet is legitimate; otherwise, the dynamic token information in the first request packet is illegitimate.

Preferably, in the case that the dynamic token information is the serial number on the shell of the dynamic token and the serial number stored inside the dynamic token, the certificate authority determining whether the dynamic token information in the first request packet is legitimate specifically including: the certificate authority determining whether a serial number as same as the serial number stored inside the dynamic token in the first request packet exists; if yes, the dynamic token information in the first request packet is legitimate; otherwise, the dynamic token information in the first request packet is illegitimate.

Preferably, in the case that the dynamic token information is the serial number on the shell of the dynamic token and the OTP generated by the dynamic token according to the initial seed data, before the seed data corresponding to the application information and the dynamic token information in the first request packet is obtained. Step S5 further including: the certificate authority obtaining initial seed data corresponding to the dynamic token information, generating a verification password according to the obtained initial seed data, and determining whether the verification password matches the OTP in the first request packet; if yes, obtaining seed data corresponding to the dynamic token information; otherwise, returning the information indicating that the OTP is wrong to the application server; the method further including: sending information indicating that the OTP is wrong to the interactive interface after the application server receives the information; outputting, by the interactive interface, the information indicating that the OTP is wrong after the interactive interface receives the information, and ending.

Preferably, in the case that the dynamic token information is the serial number on the shell of the dynamic token, or the serial number stored inside the dynamic token, or the serial number on the shell of the dynamic token and the OTP generated by the dynamic token according to the initial seed data. Step S6 further including: the application server waiting for receiving programming confirmation; the method further including: after receiving the programming confirmation, the application server storing the serial number in the dynamic token with the user's information correspondingly, and ending.

Preferably, obtaining, by the certificate authority, the seed data corresponding to the application information and the dynamic token information in the first request packet specifically including: the certificate authority searching a stored seed data corresponding to the application information and the dynamic token information in the first request packet.

Preferably, obtaining, by the certificate authority, the seed data corresponding to the application information and the dynamic token information in the first request packet specifically including: the certificate authority generating seed data, which includes seed cipher, corresponding to the application information and the dynamic token information in the first request packet, and storing the seed data along with the application information and the dynamic token information in the first request packet correspondingly.

Preferably, after the dynamic token obtains the seed data and the application information, the method further including: the dynamic token decrypting the seed cipher to obtain a seed plain text.

Preferably, the seed data including: the seed cipher, a length of a password, time interval, time of automatic close down, affordable time for password error, time of automatic unlock, a period of automatic unlock, time of pressing a key for starting, a length of unlock code and/or a length of unlock challenge code.

Preferably, the method further including an application login authentication process, wherein the authentication process specifically includes:

Step A1), searching corresponding seed data according to application information in a request for generating a password after the dynamic token receives the request for generating a password, generating an OTP according to a searched seed data, and outputting a generated OTP;

Step A2), sending user's information and the OTP to the application server for authentication after the user's information and the OTP are received by the interactive interface, and waiting for receiving a authentication result;

Step A3), determining whether the user's information is legitimate after the user's information and the OTP are received by the application server, in the case that the user's information is legitimate, searching a serial number corresponding to the user's information, generating a second request packet according to the OTP, application information and a searched serial number, sending the second request packet to the certificate authority, waiting for receiving a authentication result of the OTP, and executing Step A4; in the case that the user's information is illegitimate, returning a result that the user's information is illegitimate to the interactive interface, and executing Step A6;

Step A4), searching seed data corresponding to the serial number and the application information in the second request packet after the second request packet is received by the certificate authority, generating an authentication password according to searched seed data, determining whether the authentication password matches the OTP in the second request packet, and returning OTP authentication information to the application server;

Step A5), after the OTP authentication information returned by the certificate authority is received by the application server, returning a result that authentication is successful to the interactive interface if the OTP authentication information is that the OTP is authenticated successfully, and executing Step A6; returning a result that the OTP is wrong to the interactive interface if the OTP authentication information is that the OTP is authenticated unsuccessfully, and executing Step A6; and Step A6), after the authentication result is received by the interactive interface, displaying an interface which is showed up after the application logins successfully if the authentication result is that authentication is successful, and the application login authentication process ending; outputting information indicating that the user's information is illegitimate if the authentication result is that the user's information is illegitimate, and the application login authentication process ending; outputting information indicating that the OTP is wrong if the authentication result is that the OTP is wrong, and the application login authentication process ending.

Preferably, in Step A3, the application server searching the serial number corresponding to the user's information, and generating the second request packet according to the OTP, the application information and the searched serial number specifically including: the application server searching a serial number corresponding to the user's information, if the serial number is found, generating the second request packet according to the OTP, the application information and the searched serial number; if the serial number is not found, returning an authentication result that the dynamic token is not bound to the interactive interface, and executing Step A6; Step A6 further including: when the authentication result is that the dynamic token is not bound, the interactive interface outputting the information indicating that the dynamic token is not bound, and the application login authentication process ending.

Preferably, after the certificate authority returns the seed data to the application server, the method further including: setting, by the certificate authority, the first certificate label corresponding to the seed data which is returned to the application server; generating, by the certificate authority, an authentication password according to the searched seed data, specifically including: checking, by the certificate authority, whether the first certificate label corresponding to the searched seed data is set; if yes, generating a first preset number of authentication password; otherwise, generating a second preset number of authentication password; the first preset number is more than the second preset number.

According to the present invention, users can self-update seed data in a dynamic token, and the dynamic token can be used in multiple applications as well.

BRIEF DESCRIPTION OF THE ACCOMPANYING DRAWINGS

The technical solutions of the embodiments of the disclosure are described clearly and completely in conjunction with the accompanying drawings as follows. Apparently, the described drawings are merely a part of but not all of the embodiments according to the disclosure. Based on the described embodiments of the disclosure, other drawings obtained by those skilled in the art without any creative work belong to the scope of the disclosure.

DETAILED DESCRIPTION OF THE INVENTION

The technical solution in the embodiments of the present invention is further described more clearly and completely with the drawings in the embodiments of the present invention. Apparently, embodiments described are just a few of all Embodiments of the present invention. On the basis of embodiments of the invention, all other related embodiments made by those skilled in the art without inventive work belong to the scope of the invention.

Embodiment 1

Figure 1:
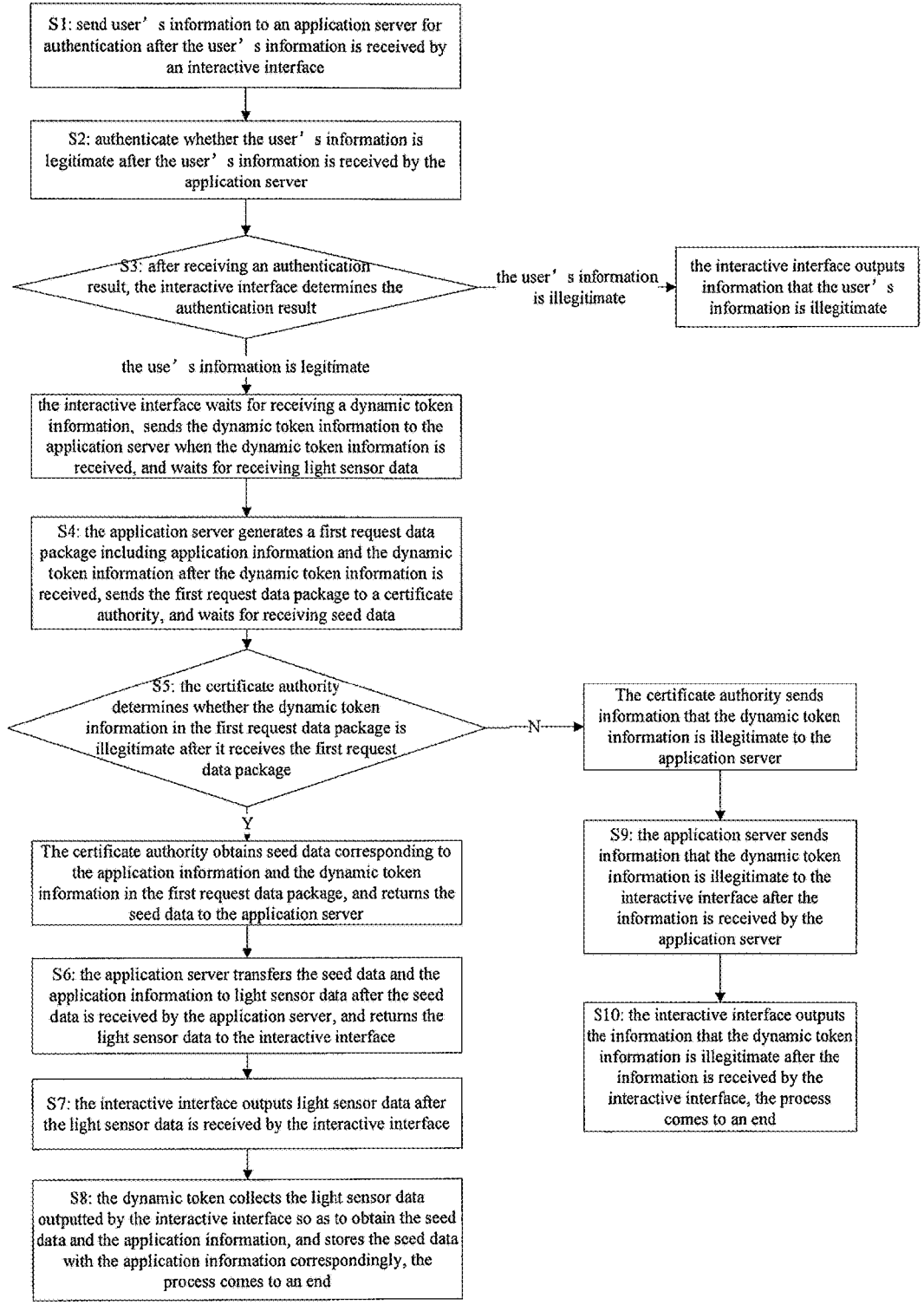
FIG. 1 is a diagram illustrating a method for updating seed data in a dynamic token according to Embodiment 1 of the present invention.

The present embodiment 1 provides a method for updating seed data in a dynamic token, which is applied in a system including a dynamic token, client and a certificate authority, in which, the client includes an interactive interface and an application server. As shown in FIG. 1, the method specifically includes:

Step S1), user's information is sent to the application server for being authenticated after the user's information is received by the interactive interface, and an authentication result is waited for;

Step S2), after the user's information is received by the application server, whether the user's information is legitimate is authenticated, and a authentication result is returned to the interactive interface;

Step S3), after the authentication result is received by the interactive interface, the received authentication result is determined; if the authentication result is that the user's information is illegitimate, information indicating that the user's information is illegitimate is outputted by the interactive interface, and the step comes to an end; if the authentication result is that the user's information is legitimate, the interactive waits for receiving dynamic token information, when the dynamic token information is received, the dynamic token information is sent to the application server, and light sensation data is waited for receiving;

Step S4), after the dynamic token information is received by the application server, a first request packet including the application information and the dynamic token information is generated and sent to a certificate authority, and seed data is waited for receiving;

Step S5), after the first request packet is received by the certificate authority, whether the dynamic token information in the first request packet is legitimate is determined; if yes, seed data, which corresponds to the application information and the dynamic token information in the first request packet, is obtained by the certificate authority, and the seed data is returned to the application server, and Step S6 is executed; otherwise, information indicating that the dynamic token information is illegitimate is returned by the certificate authority to the application server, and Step S9 is executed;

Step S6), after the seed data is received by the application server, the seed data and the application information are transferred into light sensation data, and the light sensation data is returned to the interactive interface;

Step S7), after it is received by the interactive interface, the light sensation data is output; Step S8), the light sensation data outputted by the interactive interface is collected by the dynamic token to obtain seed data and the application information, the seed data is stored with the application information correspondingly, and the step comes to an end;

Step S9), after information indicating that the dynamic token information is illegitimate is received by the application server, the information indicating that the dynamic token information is illegitimate is sent to the interactive interface;

Step S10), after the information indicating that the dynamic token information is illegitimate is received by the interactive interface, the information indicating that the dynamic token is illegitimate is outputted, and the step comes to an end.

In the present embodiment 1, the dynamic token information specifically includes: a serial number on a shell of the dynamic token; or a serial number stored inside the dynamic token; or the serial number on the shell of the dynamic token and the serial number stored inside the dynamic token; or the serial number on the shell of the dynamic token and an OTP generated by the dynamic token according to initial seed data;

in the case that the dynamic token information is the serial number stored inside the dynamic token, or the serial number on the shell of the dynamic token and the serial number stored inside the dynamic token, in Step S3, before the dynamic token information is received, the step further includes: the serial number stored inside the dynamic token is displayed after an user's request is received by the dynamic token;

in the case that the dynamic token information is the serial number on the shell of the dynamic token and the OTP generated by the dynamic token according to the initial seed data, in Step S3, before the dynamic token information is received, the step further includes: an OTP is generated according to the initial seed data stored in the dynamic token after a user's request is received by the dynamic token, and the generated OTP is displayed;

in the case that the dynamic token information is the serial number on the shell of the dynamic token and the serial number stored inside the dynamic token, in Step S4, after the dynamic token information is received by the application server, and before the first request packet including the application information and the dynamic token information is generated, the step further includes: the application server determines whether the serial number on the shell of the dynamic token in the dynamic token information is the same as a serial number which is bound to the user's information; if yes, the first request packet including the application information and the dynamic token information is generated; otherwise, information indicating that the dynamic token information does not correspond to the user's information is returned to the interactive interface; correspondingly, the method further includes: the interactive interface receives information indicating that the dynamic token information does not correspond to the user's information, and outputs the information indicating that the dynamic token information does not correspond to the user's information, the step comes to an end;

in the case that the dynamic token information is the serial number on the shell of the dynamic token, or the serial number stored inside the dynamic token, or the serial number on the shell of the dynamic token and the OTP generated by the dynamic token according to the initial seed data, the certificate authority determining whether the dynamic token information in the first request packet is legitimate specifically includes: the certificate authority determining whether a serial number which is as same as the serial number in the first request packet exists; if yes, the dynamic token information in the first request packet is legitimate; otherwise, the dynamic token information in the first request packet is illegitimate;

in the case that the dynamic token information is the serial number on the shell of the dynamic token and the serial number stored inside the dynamic token, the certificate authority determining whether the dynamic token information in the first request packet is legitimate specifically includes: the certificate authority determines whether a serial number which is as same as the serial number stored in the dynamic token in the first request packet exists; if yes, the dynamic token information in the first request packet is legitimate; otherwise, the dynamic token information in the first request packet is illegitimate;

in the case that the dynamic token information is the serial number on the shell of the dynamic token and the OTP generated by the dynamic token according to the initial seed data, in Step S5, before obtaining the seed data corresponding to the application information and the dynamic token information in the first request packet, the step further includes: the initial seed data corresponding to the dynamic token information is obtained by the certificate authority, a password is generated according to an obtained initial seed data, whether the password matches the OTP in the first request packet is determined; if yes, seed data corresponding to the dynamic token information is obtained; otherwise, information indicating that the OTP is wrong is returned to the application server; correspondingly, the method further includes: after the information indicating that the OTP is wrong is received by the application server, the information indicating that the OTP is wrong is sent to the interactive interface; after the information is received by the interactive interface, the information indicating that the OTP is wrong is outputted, and the step comes to an end;

in the case that the dynamic token information is the serial number on the shell of the dynamic token, or the serial number stored inside the dynamic token, or the serial number on the shell of the dynamic token and the OTP generated by the dynamic token according to the initial seed data, Step S6 further includes: the application server waits for receiving programming confirmation; correspondingly, the method further includes: after the programming confirmation is received by the interactive interface, the programming confirmation is sent to the application server; after the programming confirmation is received by the application server, the serial number in the dynamic token information is stored with the user's information correspondingly, and the step comes to an end.

Figure 2:
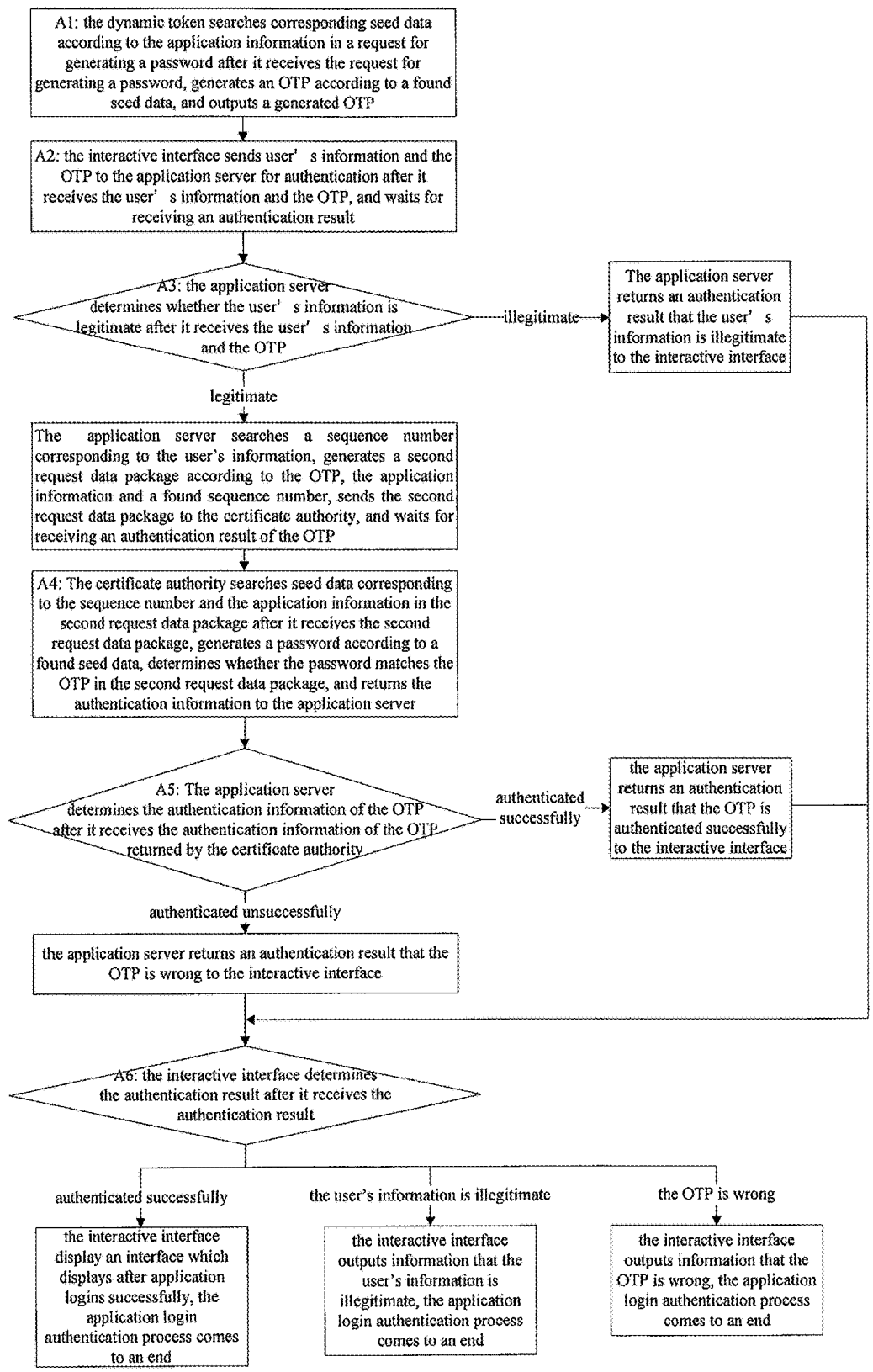
FIG. 2 illustrates a diagram of an application login authentication process in the method for updating seed data in a dynamic token according to Embodiment 1 of the present invention.

As shown in FIG. 2, the method further includes an application login authentication process, which includes:

Step A1), after a request for generating a password is received by the dynamic token, corresponding seed data is searched according to application information in the request for generating a password, an OTP is generated according to a searched seed data and outputted;

Step A2), after the user's information and the OTP are received by the interactive interface, the user's information and the OTP are sent to the application server for authentication, an authentication result is waited for being received;

Step A3), after the user's information and the OTP are received by the application server, whether the user's information is legitimate is determined; if yes, a serial number corresponding to the user's information is searched by the application server, a second request packet is generated according to the OTP, the application information and a found serial number, the second request packet is sent to the certificate authority, and an authentication result of the OTP is waited for being received, Step A4 is executed; if the user's information is illegitimate, an authentication result that the user's information is illegitimate is returned to the interactive interface by the application server, and Step A6 is executed;

Step A4), after the second request packet is received by the certificate authority, seed data corresponding to the serial number and the application information in the second request packet is searched, a password is generated according to a found seed data; whether the password matches the OTP in the second request packet is determined, and the authentication information of the OTP is returned to the application server;

Step A5), after the application server receives the authentication information of the OTP returned by the certificate authority, the authentication information of the OTP is determined, an authentication result that the OTP is authenticated successfully is returned to the interactive interface by the application server in the case that the authentication information of the OTP is that the OTP is authenticated successfully, and Step A6 is executed; an authentication result that the OTP is wrong is returned to the interactive interface by the application server in the case that the authentication information of the OTP is that the OTP is authenticated unsuccessfully, and Step A6 is executed;

Step A6), after the authentication result is received by the interactive interface, the result is determined, an interface which is showed up after the application logins successfully is displayed if the authentication result is that the OTP is authenticated successfully, and the application login authentication process comes to an end; information indicating that the user's information is illegitimate is outputted if the authentication result is that the user's information is illegitimate, and the application login authentication process comes to an end; information indicating that the OTP is wrong is outputted if the authentication result is that the OTP is wrong, and the application login authentication process comes to an end.

Embodiment 2

Figure 3:
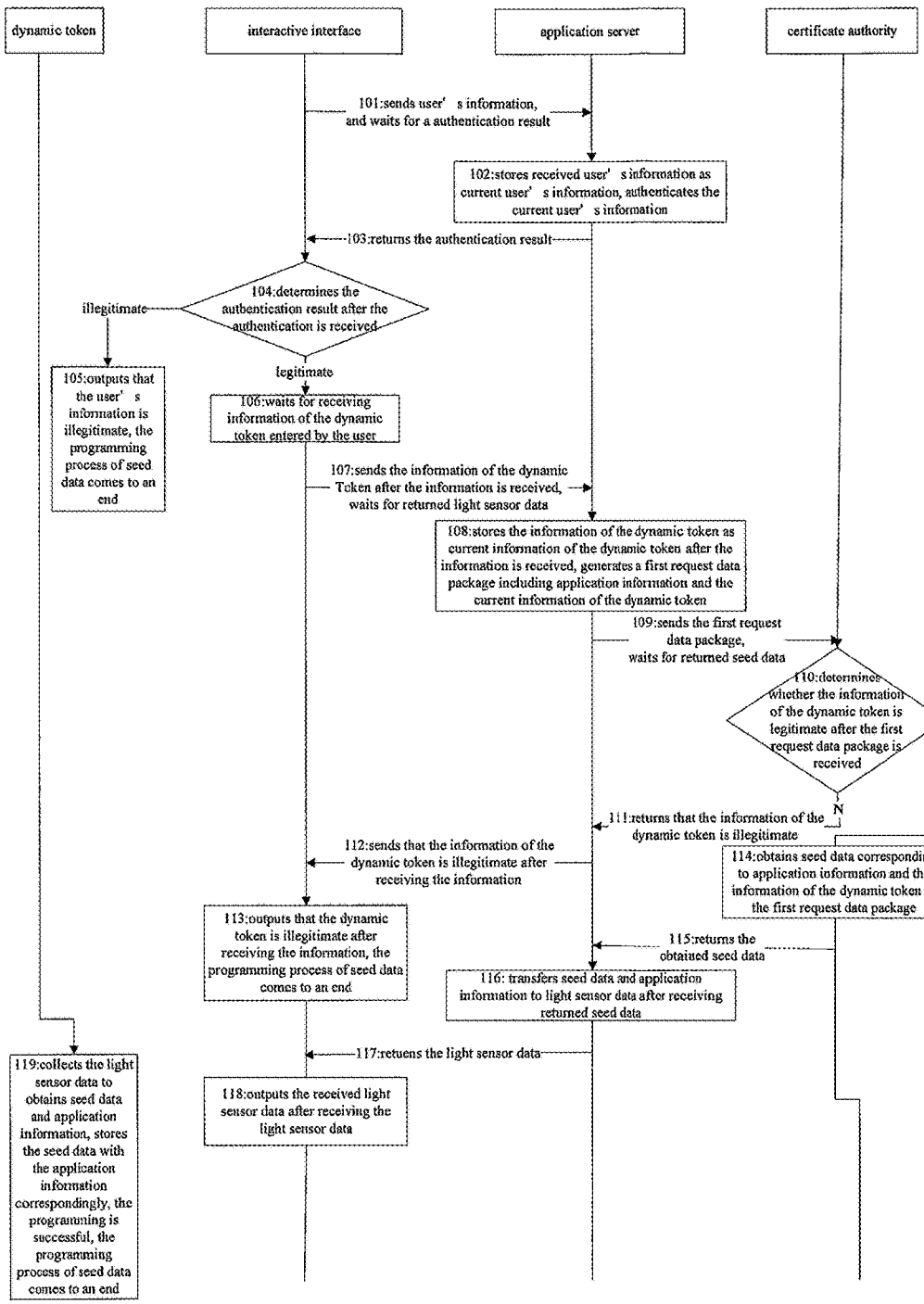
FIG. 3 illustrates a diagram of a seed data programming process in the method for updating seed data in a dynamic token according to Embodiment 2 of the present invention.

Embodiment 2 provides a method for updating seed data in a dynamic token, which is applied to a system including a dynamic token, a client and a certificate authority, in which, the client includes an interactive interface and an application server. The method comprises a programming process of seed data and an application login authentication process:

As shown in FIG. 3, the programming process of seed data includes:

Step 101, after user's information entered by a user is received by the interactive interface, the user's information is sent to an application server, and an authentication result returned by the application server is waited for being received;

Specifically, the user's information includes a user name and a user password, etc.

Step 102, after the user's information sent by the interactive interface is received by the application server, the received user's information is stored as current user's information, and the current user's information is authenticated whether it is legitimate;

Step 103, an authentication result is returned to the interactive interface by the application server;

specifically, in Embodiment 2, an authentication result that the user's information is legitimate is returned to the interactive interface in Step 103 in the case that the current user's information is authenticated as legitimate in Step 102; an authentication result that the user's information is illegitimate is returned to the interactive interface in Step 103 in the case that the current user's information is authenticated as illegitimate in Step 102.

Step 104, after an authentication result returned by the application server is received by the interactive interface, the authentication result is determined, Step 105 is executed if the result is that the user's information is illegitimate; Step 106 is executed if the result is that the user's information is illegitimate;

Step 105, information indicating that the user's information is illegitimate is outputted by the interactive interface, the programming process of seed data comes to an end;

Furthermore, in Embodiment 2, after the information indicating that the user's information is illegitimate is outputted by the interactive interface, the method further includes: information indicating that enter user's information again is outputted, the system waits for receiving the user's information re-entered by the user, and Step 101 is returned to.

Step 106, the interactive interface waits for receiving dynamic token information entered by a user;

preferably, the dynamic token information specifically is a serial number on a shell of the dynamic token, or a serial number stored inside the dynamic token which is displayed on the LCD of the dynamic token, or the serial number on the shell of the dynamic token and the serial number stored inside the dynamic token which is displayed on the LCD of the dynamic token, or the serial number on the shell of the dynamic token and an OTP displayed on the LCD of the dynamic token.

Step 107, after the dynamic token information entered by the user is received by the interactive interface, the dynamic token information is sent to the application server, the application server is waited for returning light sensation data;

in Embodiment 2, in the case that the dynamic token information is the serial number stored inside the dynamic token, which is displayed on the LCD of the dynamic token, or the serial number on the shell of the dynamic token and the serial number stored inside the dynamic token, Step 107 further includes: the serial number stored in the dynamic token is displayed after a user's request is received by the dynamic token;

in the case that the dynamic token information is the serial number on the shell of the dynamic token and the OTP displayed on the LCD of the dynamic token, Step 107 further includes: after a user's request is received by the dynamic token, an OTP is generated according to an initial seed which is programmed before the dynamic token leaves factory, and a generated OTP is displayed.

Step 108, after the dynamic token information sent by the interactive interface is received by the application server, the received dynamic token information is stored as current dynamic token information, and a first request packet including application information and the current dynamic token information is generated;

in Embodiment 2, in the case that the dynamic token information is the serial number on the shell of the dynamic token (hereafter referred to as external number) and the serial number, which is displayed on the LCD of the dynamic token, stored inside the dynamic token, after the dynamic token information sent by the interactive interface is received by the application server, the method further includes that determine whether the external number is same as the serial number of the dynamic token which is bound with the current user's information; if yes, the first request packet including the application information and the current dynamic token information is generated; otherwise, information indicating that the dynamic token information does not match the user's information is returned to the interactive interface, after the interactive interface receives the information, the information is outputted, the programming process of seed data comes to an end;

Step 109, the first request packet is sent to the certificate authority by the application server, the seed data returned by the certificate authority is waited for;

Step 110, after the first request packet sent by the application server is received by the certificate authority, whether the dynamic token information in the first request packet is legitimate is determined; if yes, Step 114 is executed; otherwise, Step 111 is executed;

Specifically, in the case that the dynamic token information is the serial number on the shell of the dynamic token, or the serial number stored inside the dynamic token, or the serial number on the shell of the dynamic token and the OTP displayed on the LCD of the dynamic token, determining whether the dynamic token in the first request packet is legitimate includes: determining whether there exists a serial number which is as same as the serial number in the first request packet; if yes, the dynamic token information in the first request packet is legitimate; otherwise, the dynamic token information in the first request packet is illegitimate;

In the case that the dynamic token information is the serial number on the shell of the dynamic token (hereafter referred to as the external number) and the serial number, which is displayed on the LCD of the dynamic token, stored in the dynamic token (hereafter referred to as an internal number), determining whether the dynamic token information in the first request packet is legitimate includes: determining whether there exists a serial number which is as same as the internal number in the first request packet in the certificate authority; if yes, the dynamic token information in the first request packet is legitimate; otherwise, the dynamic token information in the first request packet is illegitimate.

Step 111, information indicating that the dynamic token information is illegitimate is returned to the application server by the certificate authority;

Step 112, after the information indicating that the dynamic token information is illegitimate returned by the certificate authority is received by the application server, the information is sent to the interactive interface;

Step 113, after the information indicating that the dynamic token information is illegitimate sent by the application server is received by the interactive interface, the information indicating that the dynamic token information is illegitimate is outputted, the programming process of seed data comes to an end;

Furthermore, in Embodiment 2, after the information indicating that the dynamic token is illegitimate is outputted by the interactive interface, the method further includes information indicating that prompt a user to re-enter dynamic token information is outputted, Step 106 is returned to.

Step 114, seed data corresponding to the application information and the dynamic token information in the first request packet is obtained by the certificate authority;

in the present embodiment 2, in the case that the dynamic token information is the serial number on the shell of the dynamic token and the OTP displayed on the LCD of the dynamic token, before the seed data corresponding to the application information and the dynamic token information in the first request packet is obtained by the certificate authority, the step further includes: initial seed data corresponding to the dynamic token information is obtained, a password is generated according to an obtained initial seed data, whether the password matches the OTP in the first request packet is determined; if yes, seed data corresponding to the application information and the dynamic token information in the first request packet is obtained; otherwise, information indicating that the OTP is wrong is returned to the application server, after the application server receives the information, the information indicating that the OTP is wrong is sent to the interactive interface, after the interactive interface receives the information, the information indicating that the OTP is wrong is outputted, the programming process of seed data comes to an end;

in Embodiment 2, the password may be one OTP or multiple OTPs, if the OTP in the first request packet is as same as the password, or one OTP of the password, the password matches the OTP in the first request packet; otherwise, the password does not match the OTP in the first request packet;

Specifically, obtaining the seed data corresponding to the application information and the dynamic token information in the first request packet includes: the seed data corresponding to the application information and the dynamic token information in the first request packet is searched in the certificate authority; or seed data, which includes seed cipher, corresponding to the application information and the dynamic token information in the first request packet is generated, and generated seed data is stored with the application information and the dynamic token information in the first request packet correspondingly. Specifically, the certificate authority uses a key that the certificate authority pre-agree with the dynamic token to use to encrypt seed plaintext.

In addition to the seed cipher, the seed data in the present embodiment further includes: a length of a password and/or time interval and/or time of automatic close down and/or limit times for password error and/or time of automatic unlock and/or a period of automatic unlock and/or time of pressing a key for starting and/or a length of unlock code and/or a length of unlock challenge code, etc.; the use of above data except seed cipher by the dynamic token belongs to prior art, details are unnecessary herein.

Step 115, the obtained seed data is returned to the application server by the certificate authority;

Step 116, after the seed data returned by the certificate authority is received by the application server, the seed data and the application information are transferred into light sensation data;

Step 117, the light sensation data is returned to the interactive interface by the application server;

Step 118, after the light sensation data returned by the application server is received by the interactive interface, received light sensation data is outputted;

Step 119, the light sensation data outputted by the interactive interface is collected by the dynamic token to obtain the seed data and the application information, the seed data is stored with the application information correspondingly, the programming is successful, and the programming process of seed data comes to an end.

In Embodiment 2, after the seed data is obtained by the dynamic token, the step further includes: seed cipher in the seed data is decrypted to obtain seed plaintext; specifically, the dynamic token uses a key that the dynamic token pre-consults with the certificate authority to use to decrypt seed cipher.

Specifically, in the case that the dynamic token information is the serial number on the shell of the dynamic token, or the serial number, which is displayed on the LCD of the dynamic token, stored inside the dynamic token, Step 117 further includes that the application server waits for receiving programming confirmation entered by a user, the programming confirmation is sent to the application server after the programming confirmation entered by the user is received by the interactive interface, the current serial number is stored with the current user's information correspondingly after the programming confirmation sent by the interactive interface is received by the application server, and the programming process of seed data come to an end.

in the case that the dynamic token information is the serial number on the shell of the dynamic token (hereafter referred to as the external number) and the OTP displayed on the LCD of the dynamic token, Step 117 further includes: the application server waits for receiving the programming confirmation entered by a user, the programming confirmation is sent to the application server after the programming confirmation entered by the user is received by the interactive interface; the external number in the current dynamic token information is stored with the current user's information correspondingly after the programming confirmation sent by the interactive interface is received by the application server; the programming process of seed data comes to an end.

Furthermore, after the programming confirmation sent by the interactive interface is received by the application server, the step further includes: the application server sends the programming confirmation to the certificate authority, after it receives the programming confirmation sent by the application server, the certificate authority signs that the seed data corresponding to the dynamic token information and the application information in the first request packet has been programmed; correspondingly, before the seed data corresponding to the dynamic token information and the application information in the first request packet is obtained by the certificate authority, the step further includes: the certificate authority determines whether the seed data corresponding to the dynamic token information and the application information in the first request packet has been programmed, if the seed data has not been programmed, the seed data corresponding to the application information and the dynamic token information in the first request packet is obtained by the certificate authority; if the seed data has been programmed, information indicating that the seed data has been programmed is returned to the application server by the certificate authority; after the information indicating that the seed data has been programmed returned by the certificate authority is received by the application server, the information is returned to the interactive interface; the information indicating that the seed data has been programmed is outputted after the information returned by the application server is received by the interactive interface; the programming process of seed data comes to an end.

Figure 4:
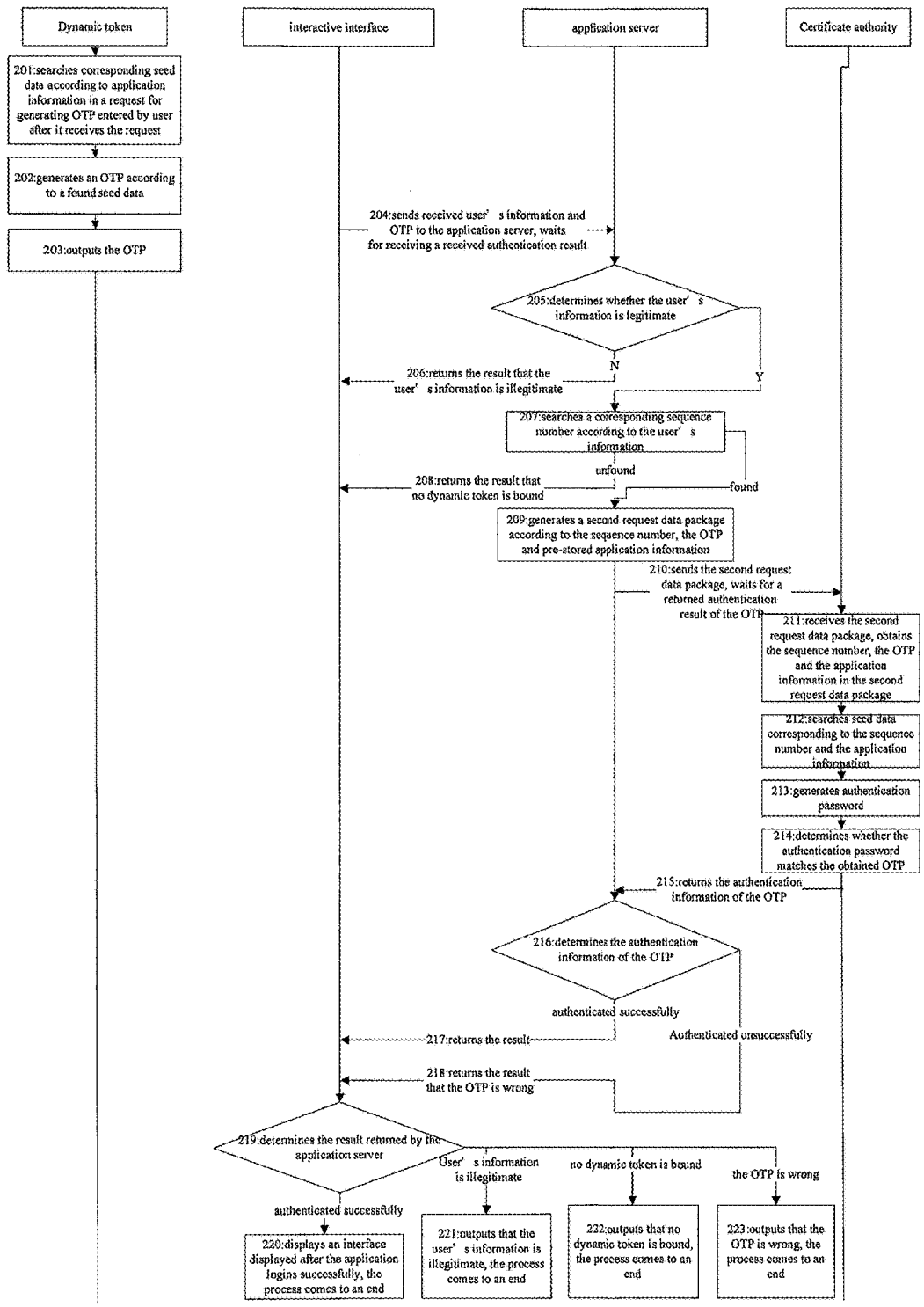
FIG. 4 illustrates a diagram of an application login authentication process in the method for updating seed data in a dynamic token according to the Embodiment 2 of the present invention.

As shown in FIG. 4, the application login authentication process includes:

Step 201, after a request for generating a password entered by a user is received by the dynamic token, corresponding seed data is searched according to application information in the request for generating a password;

Step 202, an OTP is generated by the dynamic token according to found seed data; Step 203, a generated OTP is outputted by the dynamic token; Step 204, after use's information and the OTP entered by the user is received by the interactive interface, the received user's information and the OTP are sent to the application server, an authentication result returned by the application server is waited for;

Step 205, after the application server receives the user's information and the OTP sent by the interactive interface, whether the user's information is legitimate is determined; if yes, Step 207 is executed; if no, Step 206 is executed;

Step 206, the application server returns an authentication result that the user's information is illegitimate to the interactive interface, and Step 219 is executed;

Step 207, the application server searches for a corresponding serial number according to received user's information, Step 209 is executed if the corresponding serial number is found; Step 208 is executed if the corresponding serial number is not found;

Step 208, the application server returns an authentication result that the dynamic token is not bound to the interactive interface, Step 219 is executed;

Step 209, a second request packet is generated by the application server according to a found serial number, a received OTP and a pre-stored application information;

Step 210, the second request packet is sent to the certificate authority by the application server, an authentication result of the OTP sent by the certificate authority is waited;

Step 211, a serial number, an OTP and application information included in the second request packet is obtained after the certificate authority receives the second request packet sent by the application server;

Step 212, seed data corresponding to the obtained serial number and the application information is searched by the certificate authority;

Step 213, a password is generated by the certificate authority by calculating according to a found seed data;

Step 214, the certificate authority determines whether the password matches the OTP obtained from the second request packet;

in Embodiment 2, the password may be one or multiple OTPs, if the OTP obtained according to the second request packet is as same as the password, or as same as one OTP of the password, the password matches the OTP in the second request packet; otherwise, the password does not match the OTP in the second request packet;

Preferably, before Step 213, the process further includes: the certificate authority checks whether a first certificate label corresponding to the found seed data is set, in the case that the first certificate label is set, in Step 213, the certificate authority generates an authentication window including relatively more passwords, and the first certificate label is reset; in the case that the first certificate label is not set, in Step 213, the certificate authority generates an authentication window including relatively less passwords; correspondingly, after the obtained seed data is returned to the application server by the certificate authority, the programming process of seed data further includes: the initial certificate label corresponding to the seed data is set, for example, the relatively more passwords means 100 passwords; the relatively less passwords means 10 passwords.

Step 215, the authentication information of the OTP is returned to the application server by the certificate authority, and Step 216 is executed;

specifically, in the case that the password matches the OTP obtained from the second request packet in Step 214, the authentication information indicating that the OTP is authenticated successfully is returned to the application server in Step 215; in the case that the password does not match the OTP obtained from the second request packet in Step 214, the authentication information indicating that the OTP is authenticated unsuccessfully.

Step 216, the authentication information of the OTP is determined after the authentication information returned by the certificate authority is received by the application server, Step 217 is executed in the case that the authentication information is that the OTP is authenticated successfully; Step 218 is executed in the case that the authentication information is that the OTP is authenticated unsuccessfully;

Step 217, the authentication result that the OTP is authenticated successfully is returned to the interactive interface by the application server, and Step 219 is executed;

Step 218, an authentication result that the OTP is wrong is returned to the interactive interface by the application server, and Step 219 is executed;

Step 219, the authentication result is determined after the authentication result returned by the application server is received by the interactive interface, Step 220 is executed in the case that the OTP is authenticated successfully; Step 221 is executed in the case that the user's information is illegitimate; Step 222 is executed in the case that the dynamic token is not bound to; Step 223 is executed in the case that the OTP is wrong;

Step 220, an interface which displays after an application logins successfully is displayed on the interactive interface, the application login authentication process comes to an end;

Furthermore, after the application login authentication process comes to an end and log in successfully, corresponding operation can be performed by client according to an operation request entered by a user, in this way, the user can access to an application, it is to be noted that, operations after the application login authentication process do not belong to the protective scope of the present invention.

Step 221, information indicating that the user's information is illegitimate is outputted by the interactive interface, and the application login authentication process comes to an end;

Step 222, information indicating that the dynamic token is not bound is outputted by the interactive interface, and the application login authentication process comes to an end;

Step 223, information indicating that the OTP is wrong is outputted by the interactive interface, and the application login authentication process comes to an end.

In Embodiment 2, communication data between the application server and the interactive interface includes a length and a check bit, a receiver determines whether the communication data is right via the length and the check bit in the communication data, if the communication data is right, a normal process is operated; if the communication is wrong, inform a sender that the data is wrong, and the sender re-sends communication data; furthermore, the communication data between the application server and the interactive interface can also be data which is processed according to a algorithm which is consulted by the application server and the interactive interface; more furthherly, the communication data between the application server and the interactive interface can be encrypted via internet or transferred by using a private software so as to ensure the security of the communication data.

While the preferred Embodiments of the present invention have been shown and described herein, it will be obvious for those skilled in the art that such embodiments are provided by way of examples only. Any changes and substitutions will be covered by the scope of protection of the present invention. It is intended that the appended claims define the scope of protection of the present invention.

The invention claimed is:

1. A method for updating seed data in a dynamic token comprises the steps of:

Step S1), sending, by an interactive interface, user's information to an application server for authentication after the user's information is received by the interactive interface, and waiting for receiving an authentication result;

Step S2), authenticating, by the application server, whether the user's information is legitimate after the user's information is received by the application server, and returning the authentication result to the interactive interface;

Step S3), after receiving the authentication result, outputting, by the interactive interface, information indicating that the user's information is illegitimate when the authentication result received by the interactive interface indicates that the user's information is illegitimate, and ending said method; waiting for receiving dynamic token information when the authentication result received by the interactive interface indicates that the user's information is legitimate; sending the dynamic token information to the application server when the dynamic token information is received, and waiting for receiving light sensation data;

Step S4), generating, by the application server, a first request packet which includes application information and the dynamic token information after the dynamic token information is received by the application server, subsequently, sending the first request packet to a certificate authority, and waiting for receiving seed data;

Step S5), determining, by the certificate authority, whether the dynamic token information in the first request packet is legitimate after the first request packet is received by the certificate authority; when the dynamic token information is legitimate, obtaining seed data corresponding to the application information and the dynamic token information in the first request packet, returning the seed data to the application server, and executing Step S6; otherwise, returning information indicating that the dynamic token information is illegitimate to the application server, and executing Step S9;

Step S6), transferring, by the application server, the seed data and the application information to light sensation data after the seed data is received by the application server, and returning the light sensation data to the interactive interface;

Step S7), outputting, by the interactive interface, the light sensation data after the light sensation data is received by the interactive interface;

Step S8), collecting, by the dynamic token, the light sensation data outputted by the interactive interface to obtain the seed data and the application information, and storing the seed data along with the application information correspondingly, and ending said method;

Step S9), sending, by the application server, information indicating that the dynamic token information is illegitimate to the interactive interface after the application server receives information indicating that the dynamic token information is illegitimate; and Step S10), outputting, by the interactive interface, information indicating that the dynamic token information is illegitimate after the interactive interface receives the information indicating that the dynamic token information is illegitimate, and ending said method.

2. The method as claimed in claim 1, wherein, the dynamic token information specifically comprises: a serial number on a shell of the dynamic token, a serial number stored inside the dynamic token, the serial number on the shell of the dynamic token and the serial number stored inside the dynamic token, or the serial number on the shell of the dynamic token and a one time password (OTP) generated by the dynamic token according to initial seed data.

3. The method as claimed in claim 2, wherein, when the dynamic token information is the serial number stored inside the dynamic token, or the serial number on the shell of the dynamic token and the serial number stored inside the dynamic token, before the dynamic token information is received, Step S3 further comprises: displaying, by the dynamic token, the serial number stored inside the dynamic token after a user's request is received by the dynamic token.

4. The method as claimed in claim 2, wherein, when the dynamic token information is the serial number on the shell of the dynamic token and the OTP generated by the dynamic token according to the initial seed data, before the dynamic token information is received, Step S3 further comprises: generating a second OTP according to the initial seed data stored in the dynamic token, and displaying the second OTP after a user's request is received by the dynamic token.

5. The method as claimed in claim 2, wherein, in the case that when the dynamic token information is the serial number on the shell of the dynamic token and the serial number stored inside the dynamic token, in Step S4, after the dynamic token information is received by the application server, and before the first request packet including the application information and the dynamic token information is generated, the step further comprises: determining, by the application server, whether the serial number on the shell of the dynamic token is same as a serial number which is bound with the user's information; when the serial number on the shell of the dynamic token is same as the serial number bound with the user's information, generating the first request packet which includes the application information and the dynamic token information; otherwise, returning information indicating that the dynamic token information does not match the user's information to the interactive interface; the method further comprising: outputting, by the interactive interface, the information indicating that the dynamic token information does not match the user's information when the information is received by the interactive interface, and ending.

6. The method as claimed in claim 2, wherein, in the case that when the dynamic token information is the serial number on the shell of the dynamic token, or the serial number stored inside the dynamic token, or the serial number on the shell of the dynamic token and the OTP generated by the dynamic token according to the initial seed data, determining, by the certificate authority, whether the dynamic token information in the first request packet is legitimate specifically comprises: determining, by the certificate authority, whether there exists a serial number which is the same as the serial number in the first request packet; when there exists the serial number which is the same as the serial number in the first request packet, the dynamic token information in the first request packet is legitimate; otherwise, the dynamic token information in the first request packet is illegitimate.

7. The method as claimed in claim 2, wherein, in the case that when the dynamic token information is the serial number on the shell of the dynamic token and the serial number stored inside the dynamic token, the certificate authority determining whether the dynamic token information in the first request packet is legitimate specifically comprises: the certificate authority determining whether there exist a serial number which is the same as the serial number stored inside the dynamic token in the first request packet; when there exist the serial number which is the same as the serial number stored inside the dynamic token, the dynamic token information in the first request packet is legitimate; otherwise, the dynamic token information in the first request packet is illegitimate.

8. The method as claimed in claim 2, wherein, in the case that when the dynamic token information is the serial number on the shell of the dynamic token and the OTP generated by the dynamic token according to the initial seed data, before the seed data corresponding to the application information and the dynamic token information in the first request packet is obtained, Step S5 further comprises: the certificate authority obtaining initial seed data corresponding to the dynamic token information, generating a password according to the obtained initial seed data, determining whether the password matches the OTP in the first request packet; when the password matches the OTP, obtaining seed data corresponding to the dynamic token information; otherwise, returning information indicating that the OTP is wrong to the application server; the method further comprising: sending the information indicating that the OTP is wrong to the interactive interface after the application server receives the information; outputting, by the interactive interface, the information indicating that the OTP is wrong after the interactive interface receives the information, and ending.

9. The method as claimed in claim 2, wherein, when the dynamic token information is the serial number on the shell of the dynamic token, or the serial number stored inside the dynamic token, or the serial number on the shell of the dynamic token and the OTP generated by the dynamic token according to the initial seed data, Step S6 further comprises: the application server waiting for receiving programming confirmation;

the method further comprising: after receiving the programming confirmation, sending, by the application server, the programming confirmation to the application server; storing the serial number in the dynamic token with the user's information correspondingly after the programming confirmation is received by the application server, and ending.

10. The method as claimed in claim 1, wherein, the certificate authority obtaining the seed data corresponding to the application information and the dynamic token information in the first request packet specifically comprises: the certificate authority searching a stored seed data corresponding to the application information and the dynamic token information in the first request packet.

11. The method as claimed in claim 1, wherein, the certificate authority obtaining the seed data corresponding to the application information and the dynamic token information in the first request packet specifically comprises: the certificate authority generating seed data, which includes seed cipher, corresponding to the application information and the dynamic token information in the first request packet, and storing the seed data along with the application information and the dynamic token information in the first request packet correspondingly.

12. The method as claimed in claim 11, wherein, after the seed data and the application information are obtained by the dynamic token, the method further comprises: the dynamic token decrypting the seed cipher to obtain a seed plain text.

13. The method as claimed in claim 10, wherein, the seed data comprises: the seed cipher, a length of a password, time interval, time of automatic close down, affordable time for password error, time of automatic unlock, a period of automatic unlock, time of pressing a key for starting, a length of unlock code and/or a length of unlock challenge code.

14. The method as claimed in claim 1, wherein, the method further comprises an application login authentication process which comprises:

Step A1), searching corresponding seed data according to application information in a request for generating a password after the dynamic token receives the request for generating a password, generating an one time password (OTP) according to searched seed data, and outputting the generated OTP;

Step A2), sending user's information and the OTP to the application server for authentication after the user's information and the OTP are received by the interactive interface, and waiting for receiving an authentication result;

Step A3), determining whether the user's information is legitimate after the user's information and the OTP are received by the application server, when the user's information is legitimate, searching a serial number corresponding to the user's information, generating a second request packet according to the OTP, application information and a searched serial number, sending the second request packet to the certificate authority, waiting for receiving an authentication result of the OTP, and executing Step A4; when the user's information is illegitimate, returning a result that the user's information is illegitimate to the interactive interface, and executing Step A6;

Step A4), searching seed data corresponding to the serial number and the application information in the second request packet after the second request packet is received by the certificate authority, generating a password according to searched seed data, determining whether the password matches the OTP in the second request packet, and returning OTP authentication information to the application server;

Step A5), after the OTP authentication information returned by the certificate authority is received by the application server, returning a result that authentication is successful to the interactive interface if the OTP authentication information is that the OTP is authenticated successfully, and executing Step A6; returning a result that the OTP is wrong to the interactive interface if the OTP authentication information is that the OTP is authenticated unsuccessfully, and executing Step A6; and Step A6), after the authentication result is received by the interactive interface, displaying an interface which is showed up after the application logins successfully if the authentication result is that authentication is successful, and the application login authentication process ending; outputting information indicating that the user's information is illegitimate if the authentication result is that the user's information is illegitimate, and the application login authentication process ending; outputting information indicating that the OTP is wrong if the authentication result is that the OTP is wrong, and the application login authentication process ending.

15. The method as claimed in claim 14, wherein, in Step A3, the application server searching the serial number corresponding to the user's information, and generating the second request packet according to the OTP, the application information and the searched serial number specifically comprises: the application server searching a serial number corresponding to the user's information, if the serial number is found, generating the second request packet according to the OTP, the application information and the searched serial number; if the serial number is not found, returning an authentication result that the dynamic token is not bound to the interactive interface, and executing Step A6;

Step A6 further comprising: when the authentication result is that the dynamic token is not bound, the interactive interface outputting the information indicating that the dynamic token is not bound, and the application login authentication process ending.

16. The method as claimed in claim 14, wherein, after the certificate authority returns the seed data to the application server, the method further comprises: setting, by the certificate authority, the first certificate label corresponding to the seed data which is returned to the application server; generating, by the certificate authority, an authentication password according to the searched seed data, specifically including: checking, by the certificate authority, whether the first certificate label corresponding to the searched seed data is set; when the first certificate label is set, generating a first preset number of authentication passwords; otherwise, generating a second preset number of authentication passwords; the first preset number is bigger than the second preset number.

17. The method as claimed in claim 11, wherein, the seed data comprises: the seed cipher, a length of a password, time interval, time of automatic close down, affordable time for password error, time of automatic unlock, a period of automatic unlock, time of pressing a key for starting, a length of unlock code and/or a length of unlock challenge code.

* * * * *